(12) United States Patent
Porte

(10) Patent No.: US 6,193,192 B1
(45) Date of Patent: *Feb. 27, 2001

(54) DEICING DEVICE FOR A JET ENGINE AIR INLET COWL

(75) Inventor: Alain Porte, Colomiers (FR)

(73) Assignee: Aerospatiale Societe Nationale Industrielle, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,105

(22) Filed: Nov. 12, 1998

(30) Foreign Application Priority Data

Nov. 21, 1997 (FR) .................................. 97 14611

(51) Int. Cl.[7] .................................. B64D 15/04
(52) U.S. Cl. .................................. 244/134 B
(58) Field of Search .................. 244/134 B, 53 B, 244/134 R, 207, 210, 129.4, 129.5; 285/138.1, 136.1, 223, 224, 233, 234, 235

(56) References Cited

U.S. PATENT DOCUMENTS

| 2,657,076 | * | 10/1953 | Hubbell | 285/233 |
| 2,836,436 | * | 5/1958 | Bianchi | 285/233 |
| 2,931,672 | * | 4/1960 | Merritt et al. | 285/233 |
| 3,502,356 | * | 3/1970 | Schmunk | 285/233 |
| 3,596,934 | * | 8/1971 | Cenzo | 285/55 |
| 4,522,433 | * | 6/1985 | Valentine et al. | 285/93 |
| 4,674,714 | * | 6/1987 | Cole et al. | 244/134 B |
| 4,733,890 | * | 3/1988 | Vyse | 285/148.14 |
| 4,863,354 | | 9/1989 | Asselin et al. | 416/245 R |
| 5,106,129 | | 4/1992 | Camacho et al. | 285/233 |
| 5,127,681 | * | 7/1992 | Thelen et al. | 285/121.7 |
| 5,400,984 | * | 3/1995 | Arnold et al. | 244/134 B |
| 5,772,254 | * | 6/1998 | Felber et al. | 285/16 |

FOREIGN PATENT DOCUMENTS

| 417245 | 1/1967 | (CH) . |
| 0311514 | 4/1989 | (EP) . |
| 1121222 | 6/1966 | (GB) . |
| 2259679 | * 3/1993 | (GB) .................... 224/135 B |

OTHER PUBLICATIONS

Engineering Notes, "Novel Nacelle Thermal Anti–Icing Exhaust Grill for Enchanced Mixing", Gillan et al, pp. 811–813, Nov. –1997.*

* cited by examiner

Primary Examiner—Robert P. Swiatek
(74) Attorney, Agent, or Firm—Fisher, Christen & Sabol

(57) ABSTRACT

Deicing device for the leading edge of the air inlet cowl of a jet engine. According to the invention, an injector (12) whose task is to inject pressurized hot air into the leading edge is connected to the pressurized hot air inlet by means of a ball joint (22).

17 Claims, 7 Drawing Sheets

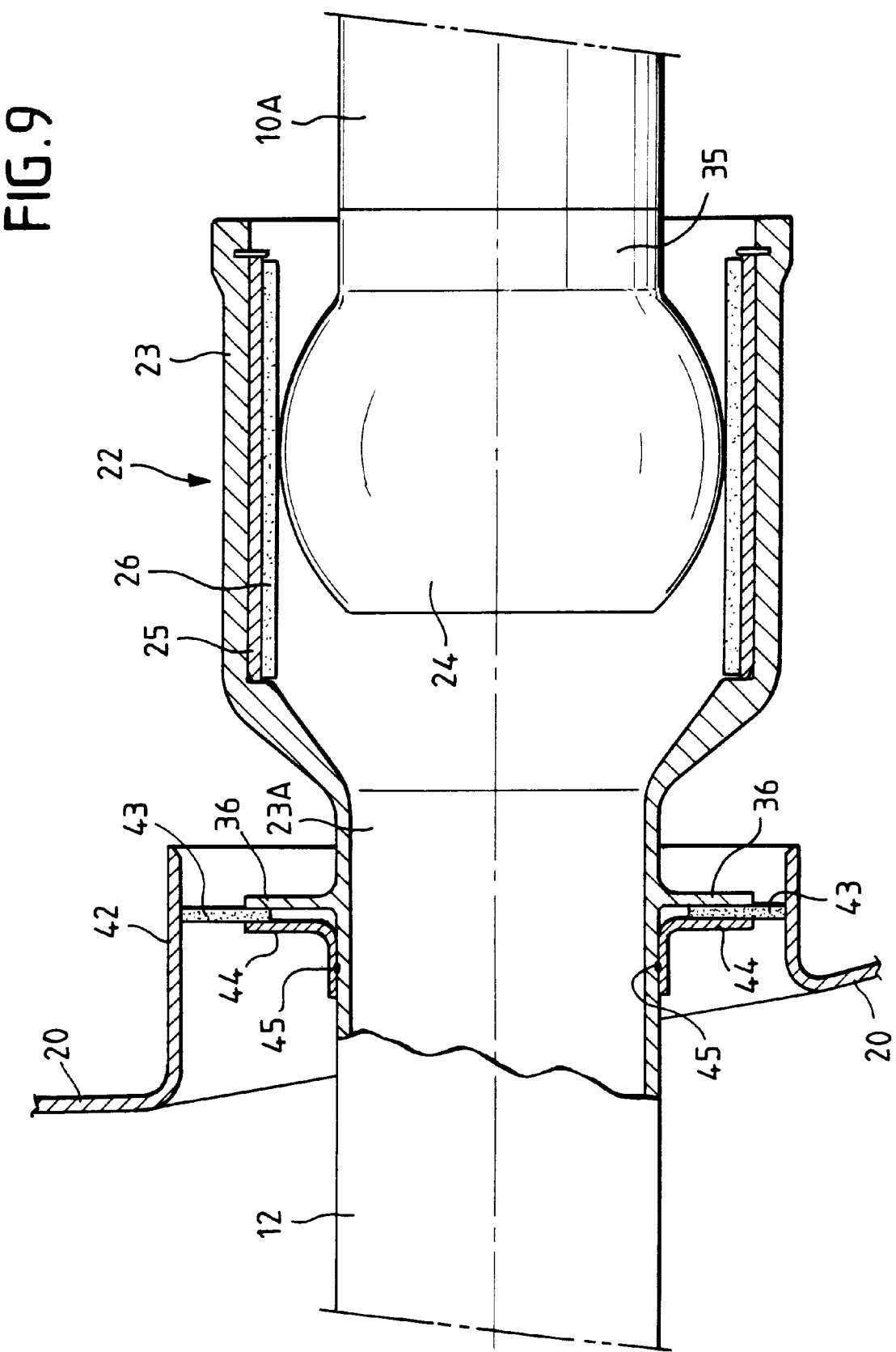

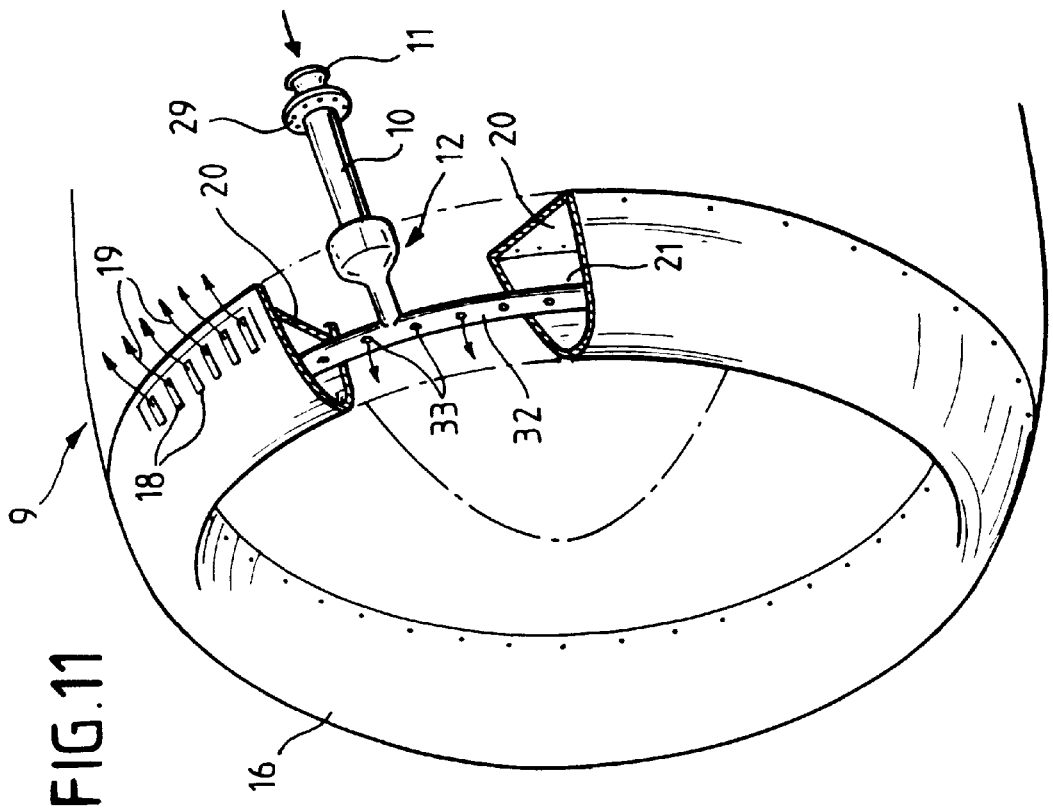
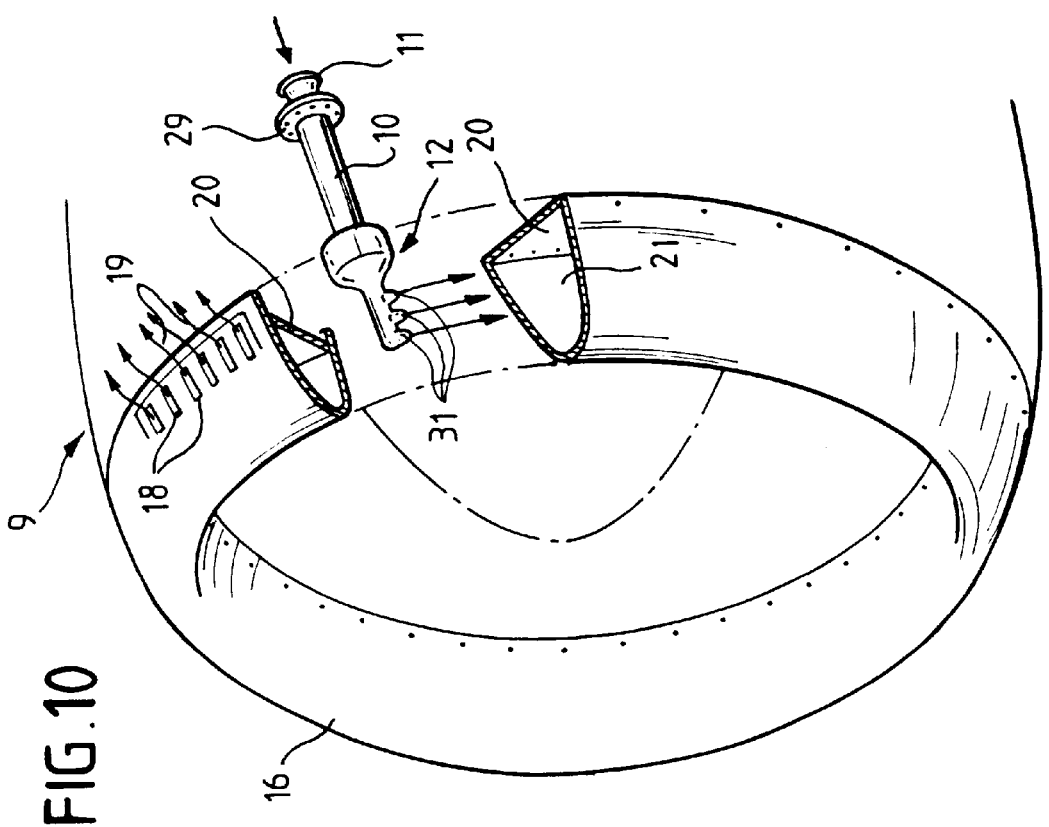

DEICING DEVICE FOR A JET ENGINE AIR INLET COWL

The present invention relates to the deicing of air inlet cowls of jet engines, especially aircraft engines.

It is known that, if need be (to prevent the formation of ice or to remove ice that has already formed), the leading edge of the air inlet cowl of such engines is deiced by heating with pressurized hot air tapped from said engine and conveyed to said leading edge by a pressurized hot air circulation circuit.

To this end, such an air inlet cowl comprises:
- a hollow leading edge delimiting an internal peripheral chamber, closed by an internal partition (or frame) and equipped with at least one orifice placing said internal chamber in communication with the outside; and
- a pipe which can be connected, at the rear end away from said leading edge, to said pressurized hot air circulation circuit and, at the front end toward the leading edge, to an injector injecting said pressurized hot air into said internal chamber.

The known devices for providing the connection between the injector and the pipe are generally of the piston or stuffing box type. However, given that the pressurized hot air tapped from the engine and conveyed by said circuit is at a high temperature, of the order of 400° C., it is necessary to use special-purpose sealing products (high-temperature seal) which entail:
- the joint being, by nature, extremely stiff,
- a system for controlling the compression of the seal, and
- a bearing surface for said seal which has a specific surface finish and a specific rigidity.

What this means is that these known connection devices are cumbersome and complicated and that they require costly special-purpose maintenance, entailing the provision of an access hatch in the engine cowl and intervention tooling which are specially reserved for maintaining said connection devices.

Furthermore, the rigidity of these connection devices entails perfect alignment between the pipe and the injector in order to avoid any risk of leaks. However, the thermal expansions and structural flexing of the engine nacelle affect this alignment and give rise to stresses in the surrounding structures.

The object of the present invention is to overcome these drawbacks.

To this end, according to the invention, the connection device that is airtight to pressurized hot air, for an air inlet cowl of a jet engine, particularly for an aircraft, said air inlet cowl being equipped with means for deicing its leading edge and comprising for this purpose:
- a hollow leading edge delimiting an internal peripheral chamber closed by an internal partition and equipped with at least one orifice placing said internal chamber in communication with the outside; and
- a pipe which can be connected, at its rear end away from said leading edge, to a pressurized hot air circuit and, at its front end toward said leading edge, to an injector injecting said pressurized hot air into said internal chamber, said airtight connection device being designed to connect said pipe to said injector, is noteworthy in that it consists of a ball joint allowing variations in the longitudinal and angular positions of said pipe with respect to said injector.

Thus, as said connection device is no longer rigid, it is no longer necessary to ensure perfect alignment between the pipe and the injector, and the mechanical stresses are avoided.

In an advantageous embodiment, said connection device comprises:
- a cylindrical chamber, open at both ends and secured to said injector at its front end; and
- a hollow ball, secured to the front end of said pipe and tightly fitted into said cylindrical chamber through the rear end thereof.

It can be seen that in this way the front end of said pipe and said hollow ball can pivot and be translated axially with respect to said cylindrical chamber and to said injector, in order to accept the tolerances, the thermal expansions, the relative moments and the structural deformations. It will also be noted that said pipe connects to the injector simply by being push-fitted into said cylindrical chamber.

In order to ensure good airtightness in the ball joint in accordance with the present invention, while at the same time avoiding excessive wear, said joint may additionally have the following particular features:
- the cylindrical internal wall of said chamber, against which said ball is pressed, is coated with an antifriction coating, which may be borne by a ring, preferably mounted removably in said cylindrical chamber so that it can be replaced;
- the hollow ball may be made of a slightly elastic metallic material, or alternatively may be made of a rigid metallic material and bear an elastic external coating. This elastic coating may hug the exterior surface of said ball or alternatively be separated therefrom by a clearance, increasing its elasticity. As an alternative, said hollow ball may bear a diametral seal cooperating with the internal wall of said cylindrical chamber;
- the hollow ball may form part of a piece, attached to the front end of said pipe, for example by welding; and
- the cylindrical chamber may comprise means for attaching it and said injector to said internal partition, it being possible for this attachment to be rigid or alternatively allow said cylindrical chamber to float longitudinally with respect to said internal partition.

Furthermore, the present invention relates to an air inlet cowl for a jet engine, particularly for an aircraft, said air inlet cowl being equipped with means for deicing its leading edge and comprising for this purpose:
- a hollow leading edge delimiting an internal peripheral chamber closed by an internal partition and equipped with at least one orifice placing said internal chamber in communication with the outside; and
- a pipe which can be connected, at its rear end away from said leading edge, to a pressurized hot air circuit and, at its front end toward said leading edge, to an injector injecting said pressurized hot air into said internal chamber, this air inlet cowl being noteworthy in that, in order to connect said injector to said pipe, it comprises a connection device which consists of a ball joint allowing variations in the longitudinal and angular positions of said pipe with respect to said injector.

Of course, this connection device may have all the features described hereinabove.

Advantageously, in the air inlet cowl in accordance with the present invention, the rear end of said pipe, which can be connected to said hot air circuit, is fixed in position on another internal partition (or frame) of said cowl. Thus, said rear end occupies a precise position making it easy to connect to the hot air circuit secured to the engine. Such attachment of said end to said other internal partition may be rigid. It may, as an alternative, allow said rear end of the pipe to slide longitudinally with respect to said other internal partition.

In a particular embodiment, the rear end of said pipe is secured to another attached piece comprising means of attachment to said other partition and means of connection to said hot air circuit.

From what has just been described it can be seen that, by virtue of the present invention, there is obtained a deicing circuit for an engine air inlet cowl, the design of which is practically isostatic and eliminates thermal and structural stresses while being durably airtight to pressurized hot air. This deicing circuit has only a few parts and its mass and cost can be optimized. What is more, it readily adapts to the tolerances and to the structural deformations of the environment.

The figures of the appended drawing will make it readily understood how the invention may be achieved. In these figures, identical references denote similar elements.

FIG. 9 shows an alternative way of attaching the ball-type connection device to said internal partition.

FIGS. 10 and 11 illustrate two alternative embodiments of the means of injecting hot air into the leading edge of the air inlet cowl.

Figure 1:
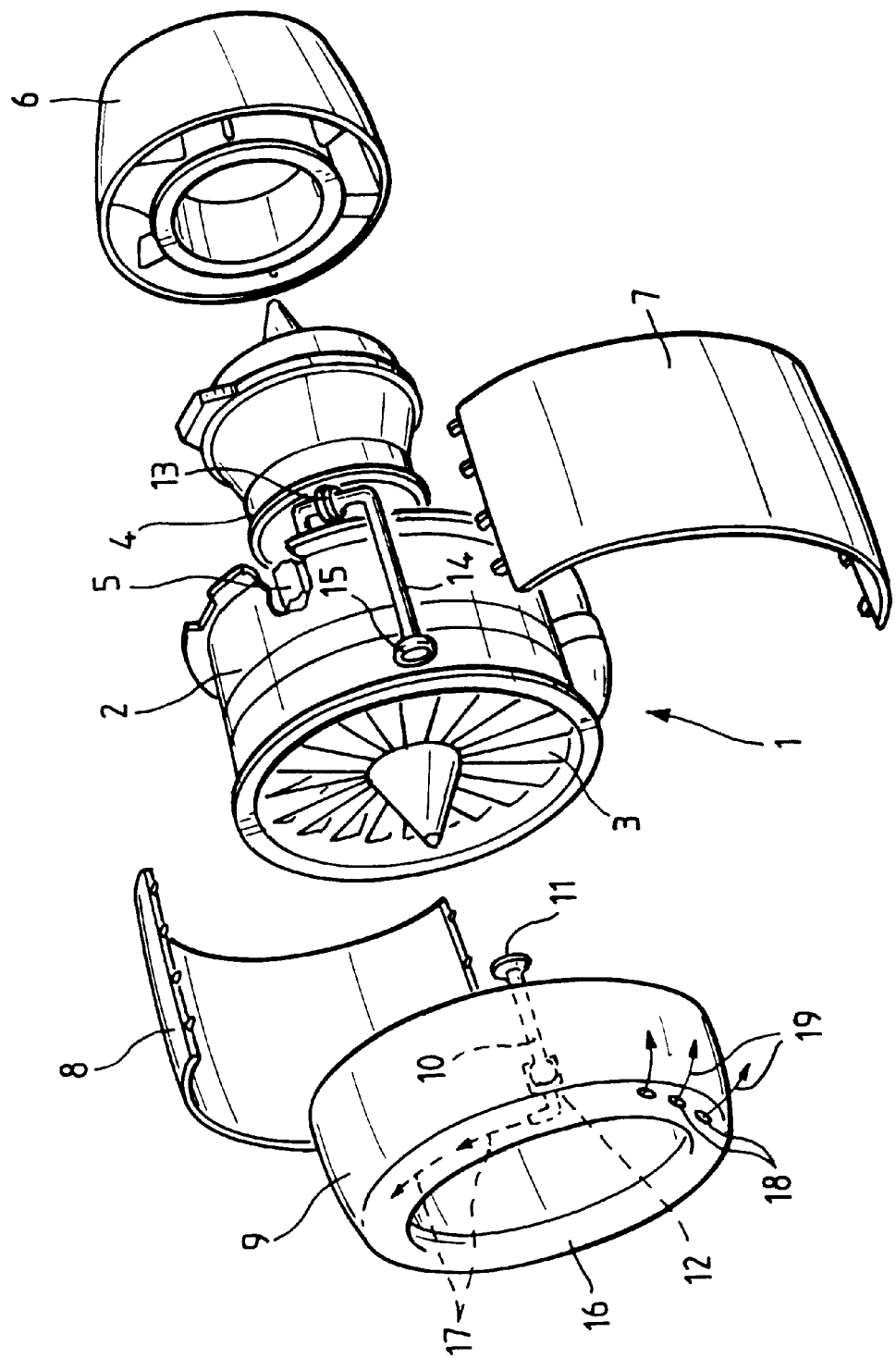
FIG. 1 shows, in exploded perspective, an aircraft jet engine and its various cowlings.

The bypass engine 1 depicted diagrammatically in FIG. 1 comprises, in the known way, a central hot air generator 2, a fan 3 and compressor stages 4 and is equipped with a hangar 5 for suspending it from a support mast (not depicted). Associated with and fixed to the engine 1 are a jet pipe assembly 6, two lateral cowls 7 and 8 and an air inlet cowl 9.

Figure 2:
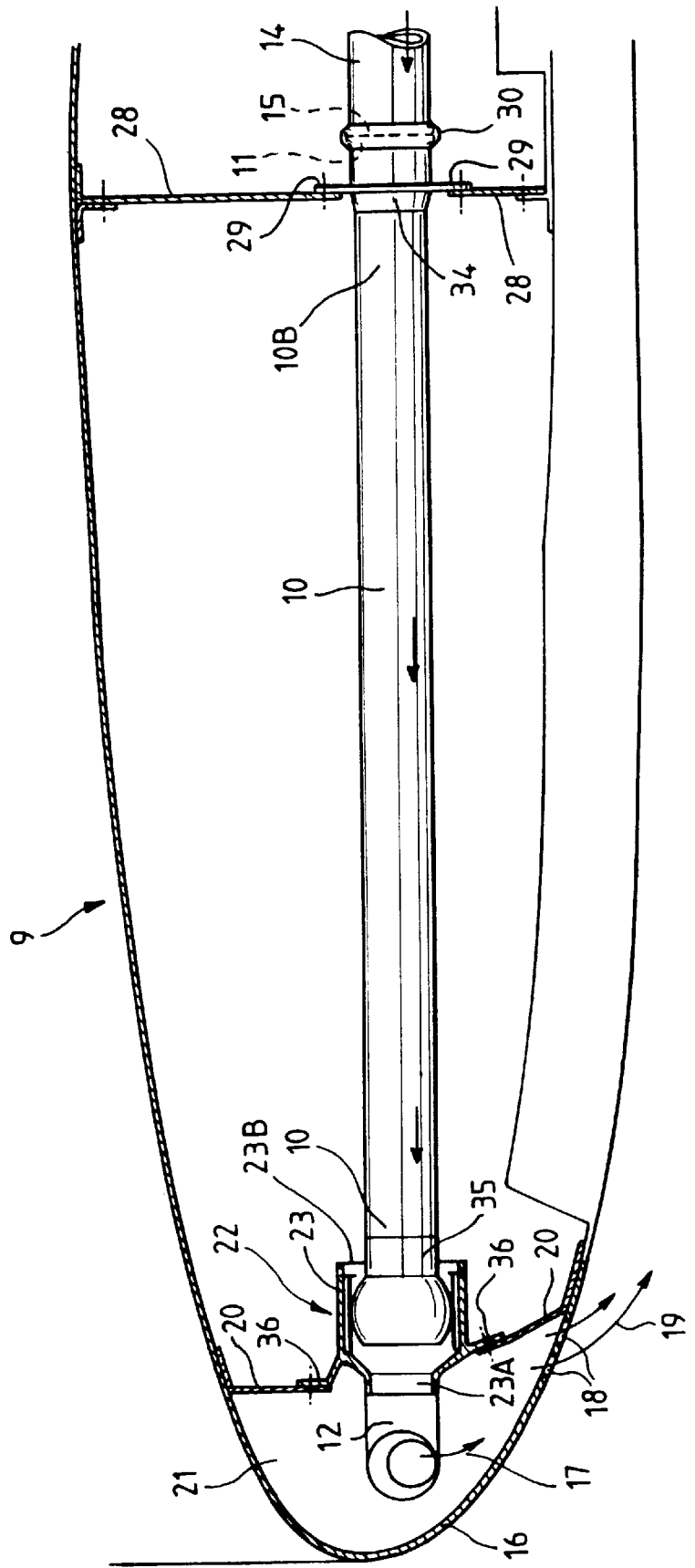
FIG. 2 is an enlarged radial half section of one embodiment of the air inlet cowl of said engine.

As is illustrated diagrammatically in FIGS. 1 and 2, the air inlet cowl 9 comprises an internal pipe 10 equipped, at its rear end 10B facing toward the engine 1, with a connector element 11 and at its front end 10A housed in the hollow leading edge 16 of said air inlet cowl, with an injector 12. Furthermore, arranged on a compressor stage of the engine 1 is a pressurized hot air tapping 13 which is connected to a pipe 14 provided, facing the connector element 11 of the pipe 10, with a complementary connector element 15.

Thus, when the complementary connector elements 11 and 15 are connected together, pressurized hot air tapped at 13 from the engine 1 is conveyed via the pipes 14 and 10 as far as the injector 12. The latter can therefore blow this hot air (arrows in broken line 17) inside the leading edge 16, in order to deice it. Orifices 18 are made for discharging to the open air (arrows 19) the hot air which has flowed inside the leading edge 16.

As shown in detail and to a larger scale in the radial half section of FIG. 2, the hollow leading edge 16 is closed at the rear end by an internal partition 20 so that an annular peripheral chamber 21 is formed inside said leading edge 16. The injector 12 passes through the internal partition 20 and injects the hot air into the chamber 21, the orifices 18 placing said chamber 21 in communication with the outside.

In accordance with the present invention, the connection between the front end 10A of the pipe 10 and injector 12 is achieved by means of a ball joint 22.

The ball joint 22 has an open cylindrical chamber 23 and a hollow ball 24. The cylindrical chamber 23 is fixed in airtight fashion to the internal partition 20 and bears the injector 12 at its front end 23A. The hollow ball 24 is attached to the front end 10A of the pipe 10 and is fitted tightly into said cylindrical chamber 23 through the rear end 23B thereof. Thus, the pressurized hot air passes from the pipe 10 to the injector 12 through the hollow ball 24 and the chamber 23.

In the embodiments depicted in FIGS. 3 to 6, it can be seen that the cylindrical chamber 23 has a cylindrical ring 25 covering the internal surface 23C of said chamber and bearing an antifriction coating 26, for example one based on carbon or tungsten carbide, forming the cylindrical bearing surface for the ball 24. The ring 25 is advantageously fixed removably in the cylindrical chamber 23, to make it easier to replace.

Figure 3:
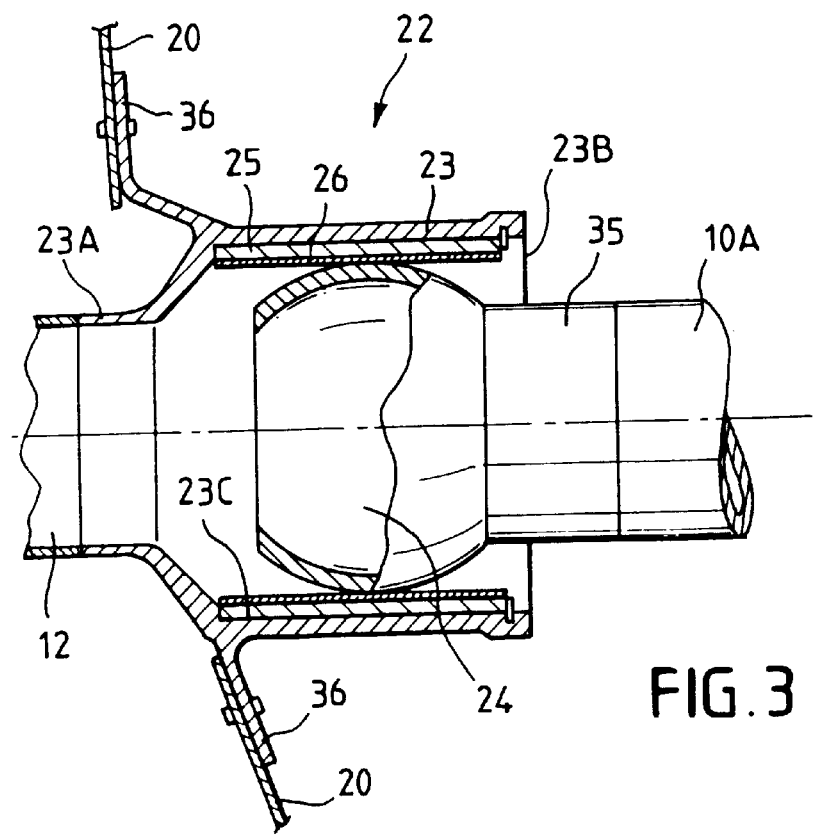
FIGS. 3 to 6 illustrate four embodiments of the ball-type connection device in accordance with the present invention.

The hollow ball 24 of the embodiment of FIG. 3 is made of a slightly elastic metal, for example is made of a stainless spring steel. Thus, airtightness to the hot air is ensured, at the ball joint 22, by the fact that the ball 24 bears directly against the antifriction coating 26 of the cylindrical chamber 23.

Figure 4:
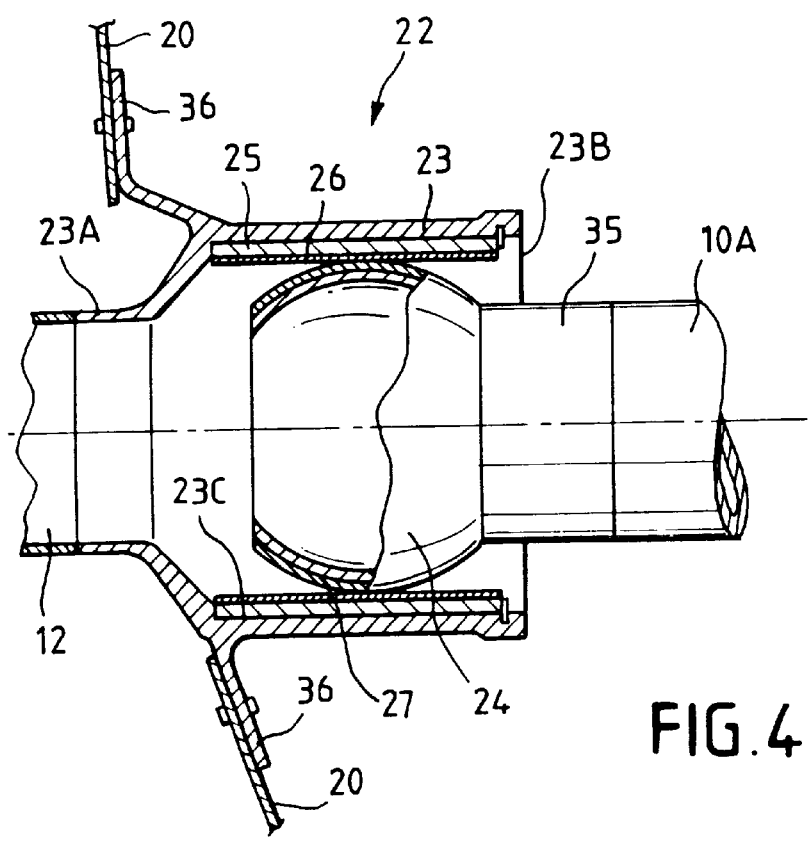

By contrast, in the embodiment of FIG. 4, the ball 24 is made of a rigid metallic material, such as the alloy known commercially by the name INCONEL and which is able to withstand high temperatures and is covered with a spherical coating 27 made of an elastic metallic material, such as bronze. In this case, the airtightness to the hot air is provided by the cooperation between the antifriction coating 26 and the elastic spherical coating 27.

Figure 5:
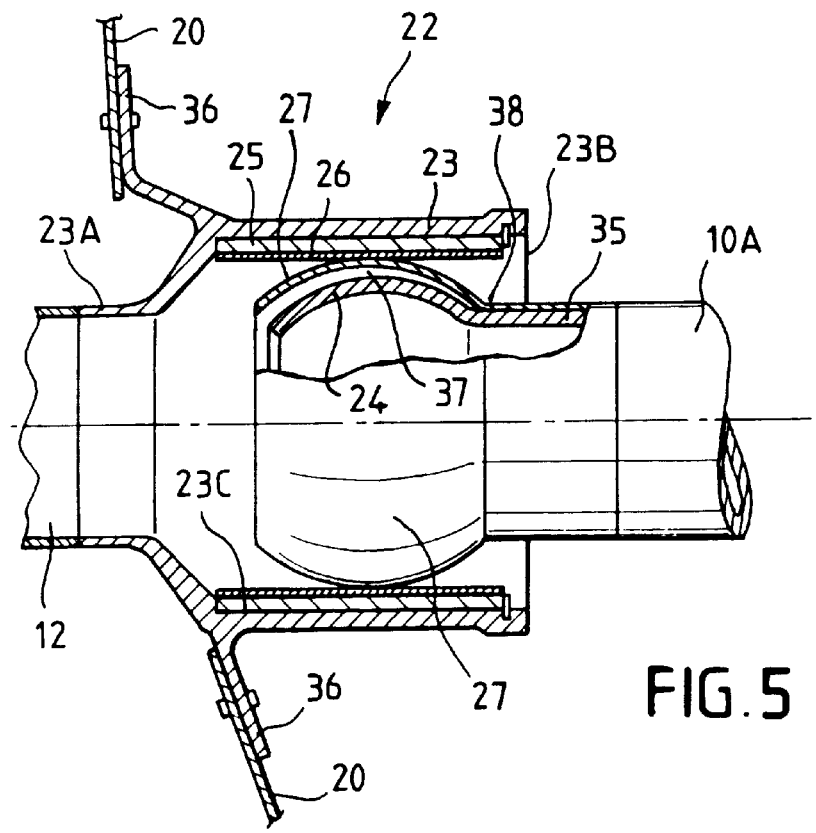

In the alternative embodiment of FIG. 5, the elastic spherical coating 27, instead of hugging the external shape of the hollow ball 24, surrounds this ball with a significant clearance 37. Of course, the elastic spherical coating 27 is secured to the hollow ball 24, at 38, at that end of this ball which faces toward the pipe 10. The elasticity of the coating 27, which may be made of INCONEL, possibly itself covered with a layer of antifriction material, such as tungsten carbide, is thus increased.

Figure 6:
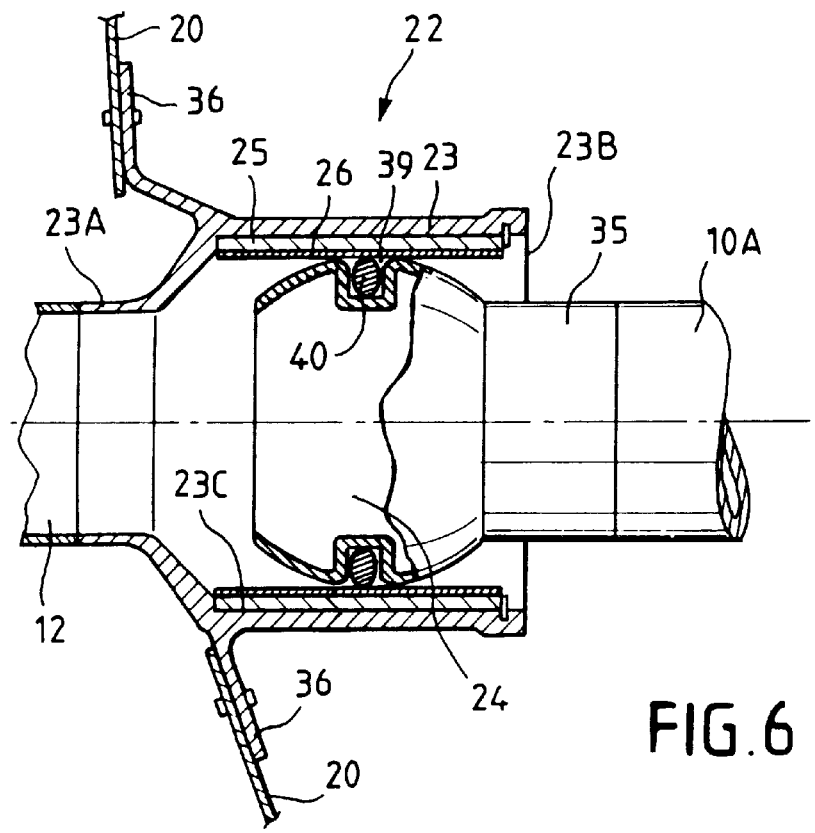

In the embodiment of FIG. 6, the ball 24 has a diametral groove 39 in which a seal 40, for example made based on silica, ceramic or glass fibers, cooperating with the antifriction coating 26 of the ring 25, is held captive.

Figure 7:
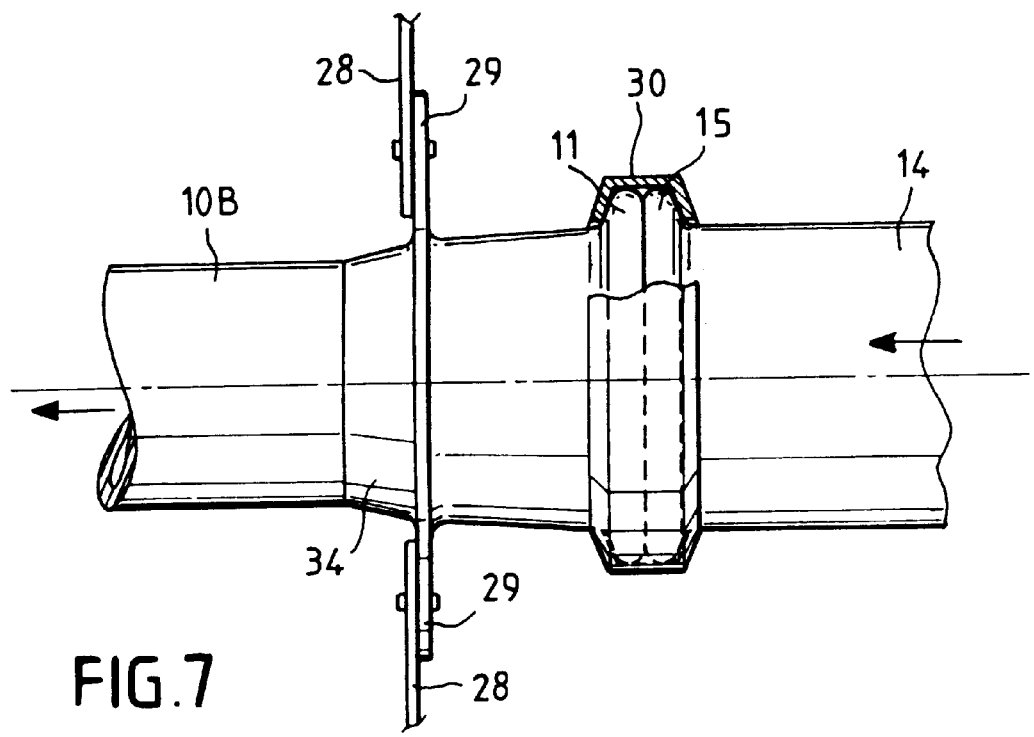
FIGS. 7 and 8 illustrate two alternative forms of the connection between the air inlet cowl and the hot air circuit.

At the rear end (see FIG. 7), away from the leading edge 16, the air inlet cowl 9 has another internal partition 28 through which the pipe 10 passes. The latter has a flange 29, for example secured to the connection element 11, allowing the rear end 10B of the pipe 10 to be secured to said internal partition 28 and ensuring that the connection element 11 is held in a precise position with respect to the connector element 15. The connector elements 11 and 15, coupled in an airtight manner, may be clamped together by a collar 30.

Furthermore, as depicted in the figures described above, it will be noted that it is advantageous for the connector element 11 and the ball 24 respectively to form part of pieces 34 and 35, these pieces being attached respectively, for example by welding, to the rear end 10B and front end 10A of the pipe 10. The flange 29 then preferably forms part of the piece 34. Likewise, the injector 12 is advantageously produced in the form of an individual piece attached, for example by welding, to the cylindrical chamber 23 of the ball joint 22. To attach it to the wall 20, this cylindrical chamber 23 has, for example, a flange 36.

Figure 8:
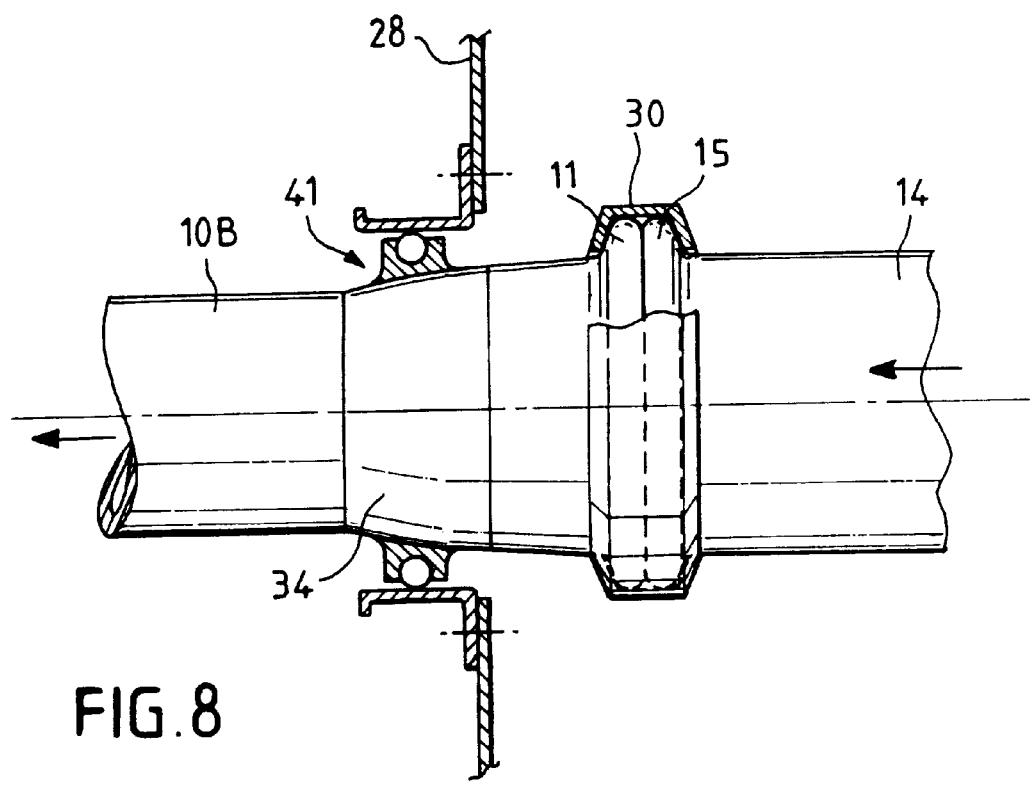

Depicted in FIG. 8 is an alternative form of the attachment of the piece 34 to the internal partition 28. In this alternative form, a sliding bearing 41 between the rear end 10B of the pipe 10 and said internal partition 28 is provided. Thus, the internal partition 28 can radially hold said rear end 10B by means of said bearing 41 which, in addition, allows this rear end to slide longitudinally. The bearing 41 therefore allows the degrees of freedom offered to the pipe 10 by the ball joint 22 to be put to good use to accept the thermal expansions of the pipe 14 without this causing said partition 28 to be stressed.

In a way which is similar to the description given hereinabove with respect to the rear end 10B of the pipe 10, it is possible for the cylindrical chamber 23 to be mounted with longitudinal float so as to eliminate, or at the very least reduce, the longitudinal stresses (with respect to the pipe 10) exerted on the internal wall 20. FIG. 9 depicts such a device for attachment with a longitudinal degree of freedom, which can be used as an alternative to the one depicted in FIGS. 2 to 6.

In the device of FIG. 9, the internal partition 20 comprises a calibrated cylindrical part 42 (for example made of a metal piece attached to said internal partition 20), in which is mounted a sealing piston 43, secured to the front part 23A of the chamber 23, for example using a collar 44 which traps the piston 43 between it and the flange 36. The collar 44 may be welded at 45 to the part 23A and may be made of a spring steel. The sealing piston 43 may be made up of one or more rings made of beryllium bronze or of INCONEL.

In FIGS. 1 and 2, the injector 12 has been depicted in the form of a simple bent pipe. It goes without saying that such an injector may be embodied in numerous ways. By way of example, in FIGS. 10 and 11, there have been depicted an injector 12 comprising a number of injection nozzles 31 (FIG. 10) and another injector 12 comprising a ring 32 of orifices 33 (FIG. 11).

What is claimed is:

1. A combination of an air inlet cowl (9) of a jet engine (1) of an aircraft and a connection device (22) that is airtight to pressurized hot air, for said air inlet cowl (9), said air inlet cowl (9) being equipped with means for deicing its leading edge (16) and comprising for this purpose:
    a hollow leading edge (16) delimiting an internal peripheral chamber (21) closed by an internal partition (20) and equipped with at least one orifice (18) placing said internal chamber (21) in communication with the outside; and
    a pipe (10) which has a front end (10A) and a rear end (10B), and which can be connected, at its rear end (10B) away from said leading edge (16), to a pressurized hot air circuit (14) and, at its front end (10A) toward said leading edge (16), to an injector (12) injecting said pressurized hot air into said internal chamber (21),
said airtight connection device (22) being designed to connect said pipe (10) to said injector (12) and comprising:
    a cylindrical chamber (23) which has an open front end (23A) and an open rear end (23B), and which is secured to said injector (12) at its front end (23A); and
    a hollow ball (24), secured to the front end (10A) of said pipe (10) and tightly fitted into said cylindrical chamber (23) through the rear end (23B) thereof;
said connection device forming a ball joint (22) allowing variations in the longitudinal and angular positions of said pipe (10) with respect to said injector (12).

2. The combination as claimed in claim 1, wherein the cylindrical in-ernal wall (23C) of said chamber (23), against which said ball is pressed, is coated with an antifriction coating (26).

3. The combination as claimed in claim 2, wherein said antifriction coating (26) is borne by a ring (25) mounted removably in said cylindrical chamber (23).

4. The combination as claimed in claim 1, wherein said ball (24) is made of a slightly elastic metallic material.

5. The combination as claimed in claim 1, wherein said ball (24) is made of a rigid metallic material and bears an elastic external coating (27).

6. The correction as claimed in claim 5, wherein said external coating (27) hugs the exterior surface of said ball (24).

7. The combination as claimed in claim 5, wherein said external coating (27) secured to said ball (24) is separated from the exterior surface thereof by a clearance (37).

8. The combination as claimed in claim 1, wherein said ball (24) bears a diametral seal (40) cooperating with the internal wall (23C) of said chamber (23).

9. The combination as claimed in claim 1, wherein said hollow ball (24) forms part of a piece (35), attached to the front end (10A) of said pipe (10).

10. The combination as claimed in claim 1, wherein said cylindrical chamber (23) comprises means (36, 42, 43, 44) for attaching it and said injector (12) to said internal partition (20).

11. The combination as claimed in claim 10, wherein the attachment of said cylindrical chamber (23) to said internal partition (20) is rigid.

12. The combination as claimed in claim 10, wherein the cylindrical chamber (23) is mounted with longitudinal float with respect to said internal partition (20).

13. An air inlet cowl (9) for a jet engine (1) of an aircraft, said air inlet cowl (9) being equipped with means for deicing its leading edge (16) and comprising for this purpose:
    a hollow leading edge (16) delimiting an internal peripheral chamber (21) closed by an internal partition (20) and equipped with at least one orifice (18) placing said internal chamber (21) in communication with the outside; and
    a pipe (10) which has front end (10A) and a rear end (10B), and which can be connected, at its rear end (10B) away from said leading edge (16), to a pressurized hot air circuit (14) and, at its front end (10A) toward said leading edge (16), to an injector (12) injecting said pressurized hot air into said internal chamber (21),
wherein, in order to connect said injector (12) to said pipe (10), this cowl comprises a connection device which consists of a ball joint (22) allowing variations in the longitudinal and angular positions of said pipe (10) with respect to said injector (12) and which comprises:
    a cylindrical chamber (23) which has an open front end (23A) and an open rear end (23B), and which is secured to said injector (12) at its front end (23A); and
    a hollow ball (24), secured to the front end (10A) of said pipe (10) and tightly fitted into said cylindrical chamber (23) through the rear end (23B) thereof.

14. The air inlet cowl (9) as claimed in claim 13, wherein the rear end (10B) of said pipe (10) which can be connected to said hot air circuit (14) is fixed in position on another internal partition (28) of said cowl.

15. The air inlet cowl (9) as claimed in claim 14, wherein said rear end (10B) of the pipe (10) is fixed rigidly to said other internal partition (28).

16. The air inlet cowl (9) as claimed in claim 14, wherein said rear end (10B) of the pipe (10) is fixed in such a way that it can slide longitudinally with respect to said other internal partition (28).

17. The air inlet cowl (9) as claimed in claim 14, wherein said rear end (10B) of said pipe (10) is secured to another attached piece (34) comprising means (29, 41) of attachment to said other internal partition (28) and means (11) of connection to said hot air circuit (14).

* * * * *